J. JOHNSON.
TREATING GUMS FOR THE MANUFACTURE OF VARNISHES, &c.
No. 43,414. Patented July 5, 1864.
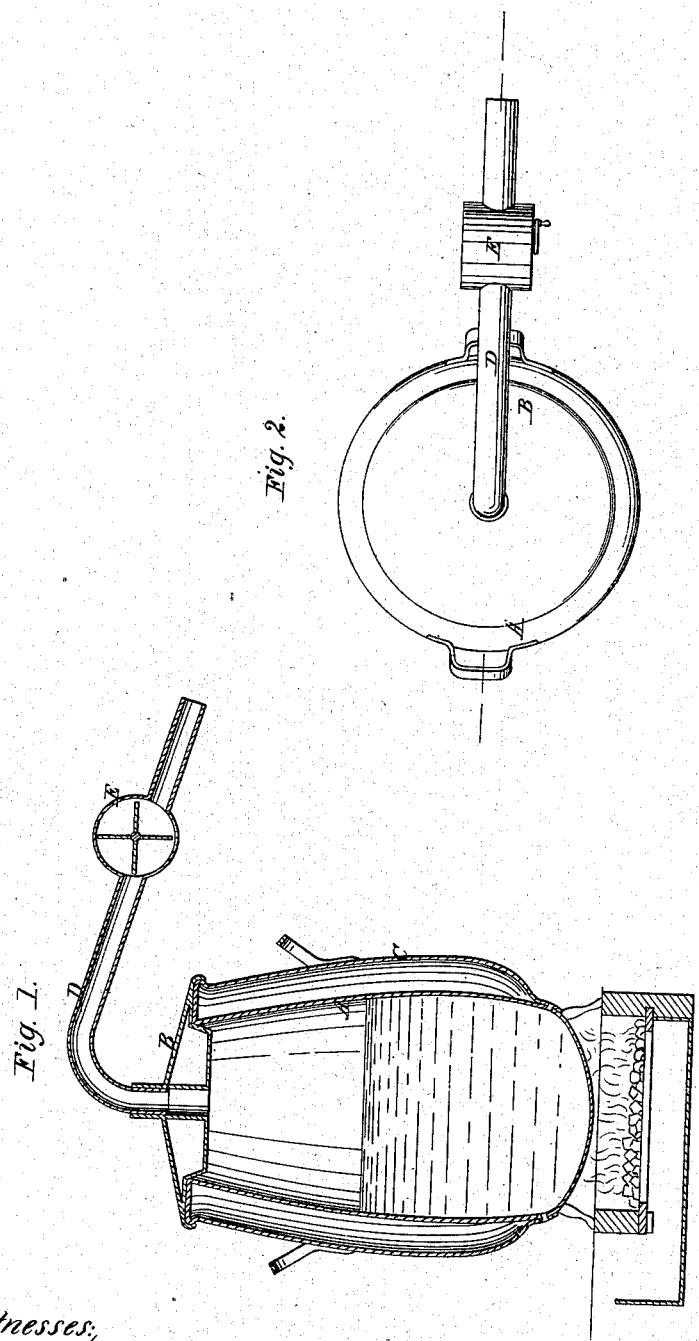

UNITED STATES PATENT OFFICE.

JOHN JOHNSON, OF SACO, MAINE.

IMPROVEMENT IN TREATING GUM FOR THE MANUFACTURE OF VARNISH.

Specification forming part of Letters Patent No. 43,414, dated July 5, 1864; antedated June 18, 1864.

*To all whom it may concern:*

Be it known that I, JOHN JOHNSON, of Saco, in the county of York and State of Maine, have invented a new and useful Improvement in Treating Gums for the Manufacture of Varnishes, &c.; and I do hereby declare that the following is a full, clear, and exact description of the same, reference being had to the accompanying drawings, forming a part of this specification, in which—

Figure 1 represents a vertical central section of the apparatus which I use in carrying out my invention. Fig. 2 is a plan or top view of the same.

Similar letters of reference in both views indicate corresponding parts.

The object of this invention is to facilitate the fusion and ebullition of such gums which are generally used in the manufacture of varnishes and for other purposes.

The nature of my invention and its particular advantages will be readily understood from the following description.

The gums used in the manufacture of varnishes, &c., are generally exposed to the heat of a coal-fire in copper kettles or boilers varying in size from those capable of fusing a few pounds up to one hundred pounds of gum at one melting.

In order to obtain the high temperature required for the fusion, ebullition, and decomposition of said gums, the fire is placed in close proximity to the bottom of the kettle, and, as at present practiced, the fusing, decomposing, and boiling of the gums is mostly limited to the bottom of the kettle or boiler. By the ebullition of the gum at the bottom a large quantity of the same, either fused or not, is forced up against the sides of the kettle or boiler, where it rapidly parts with a portion of its caloric and becomes resolidified. In this state it adheres to the sides of the kettle or boiler, and it is remelted with great difficulty even by increased temperature, and, if the temperature is thus increased, it induces destructive decomposition of a quantity of the gum, which is a dead loss; and, furthermore, the color of the fused mass is rendered much darker than it would be if the temperature had not been raised beyond the melting-point. To avoid these difficulties is the object of my invention, and I have succeeded in the following manner:

I take an ordinary kettle or boiler, A, of copper or other suitable material, and surround its body and also the cover B with a jacket, C, of a suitable non-conducting material, such as clay, sand, charcoal, or other suitable substance, said jacket being constructed with due reference to lightness, durability, and compactness. By these means all the temperature usually lost by radiation is retained in the kettle or boiler, and that portion of the gum which may be forced up to the sides by the ebullition taking place at the bottom, is melted without raising the temperature to such a height as to cause destructive decomposition or to darken the color of the molten mass. By means of my improved kettle or boiler the gums can be prepared in less time and with less fuel than with the ordinary boiler, for the admixture of oils and spirits, and when prepared they are lighter in color than those taken from an ordinary boiler, and the commercial value of the varnish is considerably improved.

In order to still further reduce the temperature within the gum boiler, I connect with the exhaust-pipe or goose-neck D, leading from said boiler, an exhauster, E, which may consist of an ordinary fan-blower, or of any other contrivance suitable for this purpose. By the application of the exhauster the gaseous products evolved in fusing the gums are removed and a partial vacuum is created within the boiler, and the fusion and ebullition of the gums, whether heat be applied to them by the direct action of the fire or the boiler, or by means of a steam-coil, or in any other desirable manner, can be effected at a lower temperature than it can when the heating takes place under the ordinary atmospheric pressure.

It is obvious that the gums prepared according to my invention can be used advantageously for a great many purposes besides the manufacture of varnishes.

What I claim as new, and desire to secure by Letters Patent, is—

1. The application of a jacket, C, of a good non-conductor for heat to the body and cover of a gum-boiler, A, in the manner and for the purpose substantially as herein specified.

2. The employment or use, in combination with a gum-boiler, A, of an exhauster, D, substantially such as herein described, or its equivalent, for the purpose set forth.

JOHN JOHNSON.

Witnesses:
THOS. J. DOUGLAS,
GEO. W. REED.